US010657470B2

(12) United States Patent
Hurst

(10) Patent No.: US 10,657,470 B2
(45) Date of Patent: May 19, 2020

(54) JOINT USE UTILITY MANAGEMENT SYSTEM

(71) Applicant: CenturyLink Intellectual Property LLC, Denver, CO (US)

(72) Inventor: Christopher E. Hurst, Fort Myers, FL (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 1109 days.

(21) Appl. No.: 14/884,569

(22) Filed: Oct. 15, 2015

(65) Prior Publication Data

US 2016/0321577 A1 Nov. 3, 2016

Related U.S. Application Data

(60) Provisional application No. 62/155,028, filed on Apr. 30, 2015.

(51) Int. Cl.
*G06Q 10/00* (2012.01)
*G06Q 10/06* (2012.01)

(52) U.S. Cl.
CPC .............................. *G06Q 10/0631* (2013.01)

(58) Field of Classification Search
CPC .. G06Q 10/06311; G06Q 10/06; G06Q 10/20; G06Q 10/063; G06Q 10/0631; G06Q 10/06316
See application file for complete search history.

(56) References Cited

U.S. PATENT DOCUMENTS

| | | | | |
|---|---|---|---|---|
| 2006/0129691 A1* | 6/2006 | Coffee | ................... | H04L 67/04 709/230 |
| 2009/0157746 A1* | 6/2009 | More | ..................... | G06Q 10/06 |
| 2013/0288719 A1* | 10/2013 | Alonzo | ................. | H04W 4/043 455/457 |
| 2014/0280277 A1* | 9/2014 | Tucker | .................... | G06F 16/29 707/758 |
| 2014/0310052 A1* | 10/2014 | Foehr | ............... | G06Q 10/06316 705/7.26 |
| 2016/0146943 A1* | 5/2016 | Knibbe | ................... | G01S 19/14 342/357.52 |

OTHER PUBLICATIONS

Mccoy, J.I. "GIS and Joint Use Management—A Productive Combination." Rural Electric Power Conference, 2005, 2005. (Year: 2005).*

* cited by examiner

*Primary Examiner* — William S Brockington, III

(57) ABSTRACT

A system for joint use utility management includes a joint use utility database maintaining joint use information indicating each member of a joint use agreement having an attachment at the respective joint use utility, and location information of the respective joint use utility. A joint use utility manager, in communication with the joint use utility database, includes at least one processor, and non-transitory computer readable media having a set of instructions executable by the at least one processor to receive a request for open job tickets associated with the first member, retrieve a list of joint use utilities associated with the first member, generate an interactive map populated with locations of each of the joint use utilities, transmit the interactive map to the end device, receive a job ticket notification, and update the status of the job ticket.

20 Claims, 7 Drawing Sheets

JOINT USE UTILITY MANAGEMENT SYSTEM

CROSS-REFERENCES TO RELATED APPLICATIONS

This application claims priority to U.S. Provisional Patent Application Ser. No. 62/155,028, filed on Apr. 30, 2015 by Christopher E. Hurst, entitled, "Mobile Application for Joint Use Utility Coordination," the disclosures of which are incorporated herein by reference, in its entirety, and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the management of joint use utility poles, and more particularly to an interactive system for managing joint use utility poles by multiple field users.

BACKGROUND

Current management solutions for managing joint use utilities are centrally based systems and databases typically maintained by one or more power companies that own utility poles in a given area. Typically, joint use utility poles are used by multiple users in addition to the power companies. As such, a joint use agreement is normally formed between the power company and each of the users of the joint use utility poles. Members of the joint use agreement include entities that utilize the joint use utility poles to attach their own lines and equipment to the joint use utility poles, such as cable and telecommunication service providers.

Oftentimes, due to exposure to weather, environmental factors, physical damage, or vandalism, the utility poles periodically need to be replaced by the power companies. In these situations, members of the joint use agreement must each also transfer their own equipment and lines to the new utility pole. This process may be referred to as a pole transfer (PT). Other times, existing equipment may merely need to be temporarily removed or replaced by the by the members of the joint use agreement.

Typically, when work needs to be completed on a joint use utility pole, the owner of the utility pole (i.e. the power company) opens a PT ticket or other work ticket identifying details of the job to be completed. The PT ticket may identify the joint use agreement members associated with the utility pole, global positioning system (GPS) coordinates indicating the location of the utility pole, one or more steps needed to complete the job on the utility pole, the type of work that needs to be completed at each step, the order in which the work must be completed, the joint use agreement member to complete each step, and the next joint use agreement member needing to complete a step in the work ticket.

When a work ticket is created by the owner of the utility pole, members of the joint use agreement must retrieve all tickets to with which they are associated with in a batch process from the management system. Furthermore, joint use agreement members must login to the system each time they wish to access updated information regarding their tickets. Similarly, for a join use agreement member to update a ticket to reflect the work they have completed for a ticket, the joint use agreement member must login to the system and update the ticket through the database manually. Accordingly, each time an update has been made to a ticket, a new batch of tickets must be retrieved by each joint use agreement member to reflect the most recent changes made to each of their respective tickets. Moreover, as only GPS coordinates are provided in each ticket corresponding to the location of the utility pole of the respective ticket, generally a field technician must manually determine the location of each utility pole, and the routes between utility poles when working on open tickets.

Under the current framework, multiple inefficiencies and redundancies are present regarding the management of work tickets, communications from field technicians, data retrieval and entry to the system, and route planning. Thus, a more efficient system for managing joint use utility communications, data retrieval, data entry, and route planning is presented by the embodiments below.

BRIEF SUMMARY

According to a set of embodiments, a system, apparatus, and method for joint use utility management are provided. The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for joint use utility management may include a joint use utility database maintaining entries for a plurality of joint use utilities, each of the entries respectively having joint use information regarding an associated joint use utility of the plurality of joint use utilities, the joint use information indicating at least each member of a joint use agreement having an attachment at the respective joint use utility, and location information of the respective joint use utility. An end device is provided that is associated with a first member of the joint use agreement. The joint use agreement may have a plurality of members, which includes the first member. The end device may be communicatively coupled to a communications network to either the joint use utility database or a joint use utility manager. The joint use utility manager may also be in communication with the joint use utility database and the end device over the communications network. The joint use utility manager may include at least one processor, non-transitory computer readable media having encoded thereon computer software comprising a set of instructions executable by the at least one processor to receive, from the end device, a request for open job tickets associated with the first member. The joint use utility manager may retrieve, from the joint use utility database, a list of joint use utilities associated with the first member having an open job ticket, and respectively associated joint use information for each of the joint use utilities. The joint use utility manager may generate an interactive map populated with an indicator of each of the joint use utilities associated with the first member based on the location information of each respective joint use utility in the list of joint use utilities, wherein job ticket information associated with each respective joint use utility is accessible through the interactive map. The joint use utility manager may transmit, via the communications network, the interactive map to the end device. Once the end device has completed work on the job ticket, the joint use utility manager may receive a job ticket notification indicating a status of the job ticket for a particular joint use utility in the list of joint use utilities. Based on the job ticket notification, the joint use utility manager may update, at the joint use utility database, the status of the job ticket for the particular joint use utility in a respective entry for the particular joint use utility.

According to a set of embodiments, the joint use utilities may include joint use utility poles. Each of the joint use utility poles may further be in communication with at least one of the joint use utility manager or end device. Each joint use utility pole may include one or more smart attachments transmitting at least one of real-time location information and joint use information for the respective joint use utility pole. In some embodiments, the smart attachment may include a global positioning system receiver in communication with a global positioning system satellite.

In another set of embodiments, the joint use utility manager may further include further instructions to retrieve, from the end device, location information indicative of a geographic location of the end device. In various embodiments, the joint use utility manager may receive a selection of at least one joint use utility of the list of joint use utilities from the end device. The joint use utility manager may then generate a route from the geographic location of the end device to a geographic location of a first joint use utility of the selection of at least one joint use utility. The route may further be plotted on the interactive.

According to various embodiments, the joint use utility manager may further include instructions to identify at least one proximate joint use utility of the list of joint use utilities that is within a threshold range of the end device as determined based on a geographic location of the end device. The location of the at least one proximate joint use utility may be indicated on the interactive map. In some further embodiments, the joint use utility manager may receive a request for open job tickets for a particular joint use utility, or a request to open a new job ticket for a particular joint use utility. The joint use utility manager may then determine whether an existing job ticket is present. If no existing job ticket is present, the joint use utility manager may create a new job ticket. A subsequent member of the joint use agreement associated with the particular joint use utility may then be identified and notified of the status of the job ticket associated with the particular joint use utility, whether existing or newly created. If no subsequent member exists, the joint use utility manager may close the existing job ticket. In some embodiments, the status of each job ticket, corresponding respectively to each joint use utility, may also be indicated on the interactive map.

In another aspect, a joint use utility manager is provided. The joint use utility manager may include at least one processor, and non-transitory computer readable media having encoded thereon computer software comprising a set of instructions. The set of instructions may be executable by the at least one processor to receive a request for open job tickets associated with a first member of a joint use agreement from an end device associated with the first member. The joint use utility manager may retrieve a list of joint use utilities associated with the first member having an open job ticket from a joint use utility database. Respectively associated joint use information for each of the joint use utilities may also be retrieved, the joint use information indicating at least each member of a joint use agreement having an attachment at a respective joint use utility, and location information of the respective joint use utility. The joint use utility manager may generate an interactive map populated with an indicator of each of the joint use utilities associated with the first member based on the location information of each respective joint use utility in the list of joint use utilities. The job ticket information may include any or all of the joint use information, and be accessible through the interactive map. The interactive map may be transmitted, via a communications network, to the end device. Once work has been completed on the job ticket, the joint use utility manager may receive, from the end device, a job ticket notification indicating a status of a job ticket for a particular joint use utility in the list of joint use utilities. The joint use utility database may then be updated with the status of the job ticket for the particular joint use utility.

According to one set of embodiments, the joint use utility manager may further include instructions to retrieve location information indicative of a geographic location of the end device from the end device itself. The processor may further receive, from the end device, a selection of at least one joint use utility of the list of joint use utilities. A route from the geographic location of the end device to a geographic location of a first joint use utility of the selection of at least one joint use utility may be generated by the joint use utility manager, and plotted on the interactive map. In some embodiments, the joint use utility manager may further identify at least one proximate joint use utility of the list of joint use utilities that is within a threshold range of the end device as determined based on the geographic location of the end device. The joint use utility manager may then indicate a location of the at least one proximate joint use utility on the interactive map. In another set of embodiments, the joint use utility manager may also retrieve location information indicative of a geographic location of the joint use utility from a smart attachment of the joint use utility.

In some embodiments, the joint use utility manager may determine whether an existing job ticket is present for a given joint use utility. If no job ticket is present, the joint use utility manager may create a new job ticket corresponding to the joint use utility. The joint use utility manager may then identify a subsequent member of the joint use agreement associated with the particular joint use utility, and notify the subsequent member of the status of the job ticket associated with the particular joint use utility. If no subsequent member exists, the joint use utility manager may then close the existing job ticket. The status of each respective job ticket corresponding to a respective joint use utility may further be indicated on the interactive map by the joint use utility manager.

In yet another aspect, a method of joint use utility management is provided. The method begins by providing, at a joint use utility database, entries for a plurality of joint use utilities, each of the entries respectively having joint use information regarding an associated joint use utility of the plurality of joint use utilities, the joint use information indicating at least each member of a joint use agreement having an attachment at the respective joint use utility, and location information of the respective joint use utility. A joint use utility manager receives a request from the end device for open job tickets, identifying a first member of the joint use agreement as having sent the request. The joint use utilities associated with the first member are then identified, and a list of joint use utilities associated with the first member that have an open job ticket are retrieved. Respectively associated joint use information for each of the joint use utilities is also retrieved. The method continues by generating, at the joint use utility manager, an interactive map populated with an indicator of each of the joint use utilities associated with the first member based on the location information of each respective joint use utility in the list of joint use utilities, wherein job ticket information associated with each respective joint use utility is accessible through the interactive map. The interactive map is transmitted, via the joint use utility manager over a communications network. Once work on the job ticket has been completed, the joint use utility manager may receive a job ticket notification submitted by the end device, the job ticket notification indicating a status of a job ticket for a particular joint use utility in the list of joint use utilities. The joint use utility database may then be updated, via the joint use utility manager, with the status of the job ticket for the particular joint use utility.

In one set of embodiments, the method further includes identifying, at the joint use utility manager, a geographic location of the end device. At least one proximate joint use utility of the list of joint use utilities that is within a threshold range of the end device as determined based on the geographic location of the end device is identified by the joint use utility manager. A location of the at least one proximate joint use utility is then indicated on the interactive map by the joint use utility manager.

In various embodiments, the joint use utility manager may further identify a geographic location of the end device. A selection from the end device of at least one joint use utility of the list of joint use utilities may be received by the joint use utility manager. Based on the selection, a route may be generated by the joint use utility manager, based on the geographic location of the end device and respective location information corresponding to each of the at least one joint use utility, from the geographic location of the end device to a geographic location of a first joint use utility of the selection of at least one joint use utility. The route may then be plotted on the interactive map.

According to a further set of embodiments, the method may further include determining, via the joint use utility manager, and based on the job ticket notification, whether an existing job ticket is present. If no job ticket is present, the method may continue by creating, via the joint use utility manager, a new job ticket. The joint use utility manager may then identify whether there is a subsequent member of the joint use agreement associated with the particular joint use utility. The subsequent member may then be notified, by the joint use utility manager, of the status of the job ticket associated with the particular joint use utility. If no subsequent member is identified, the joint use utility manager may close the job ticket.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
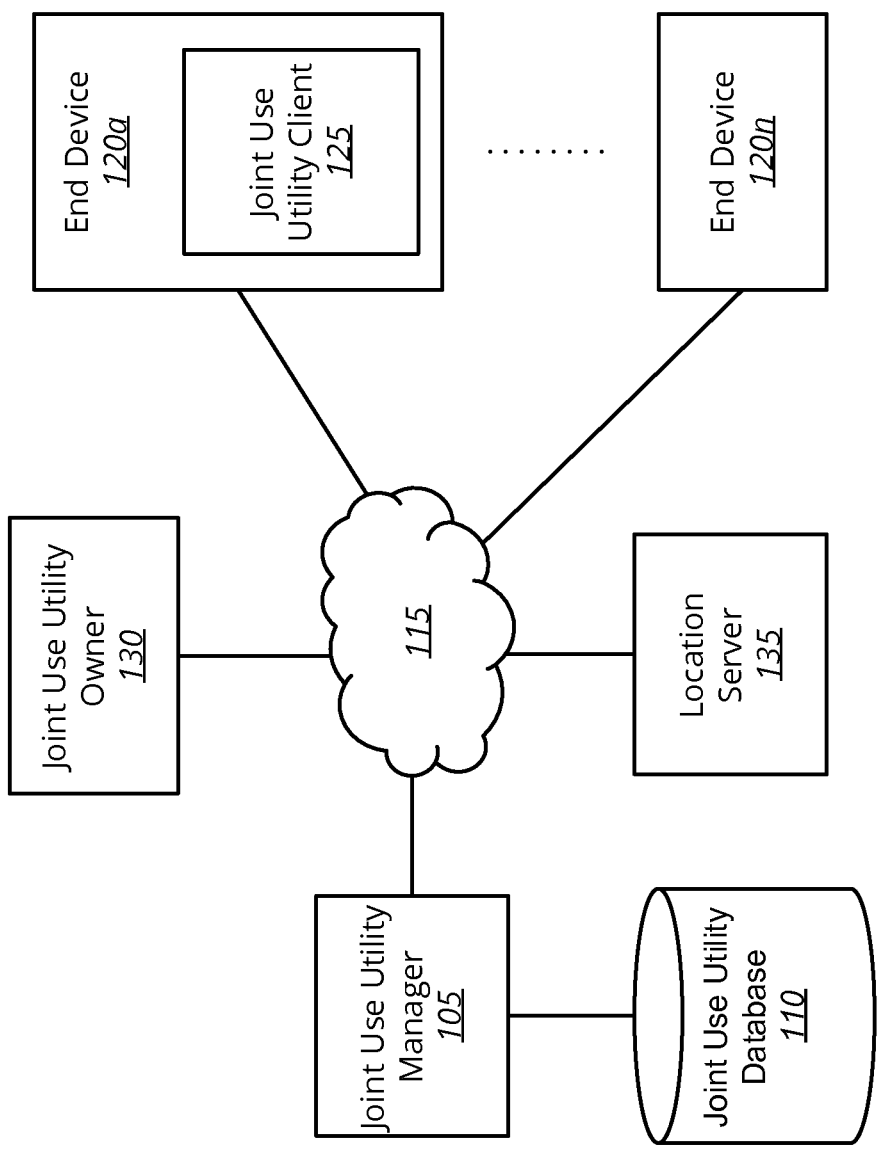
FIG. 1 is a system block diagram of a joint use utility management system, in accordance with various embodiments.

FIG. 1 illustrates a joint use utility management system 100, in accordance with various embodiments. The system 100 includes a joint use utility manager 105, joint use utility database 110, network 115, one or more end devices 120a-120n (120 collectively) having a joint use utility client 125, the joint use utility owner 130, and location server 135.

The joint use utility manager 105 is communicatively coupled, via communications network 115, to the joint use utility client 125 of each of the one or more end devices 120, and the joint use utility owner 130. The joint use utility manager 105 is further communicatively coupled to the joint use utility database 110 storing joint use information. In various embodiments, joint use information may comprise, respectively, information, attributes, and characteristics related to a particular joint use utility. For example, joint use information may include, without limitation joint use utility owner information, location information, joint use agreement member information, service area information, job ticket information, and other data relevant to the respective joint use utility.

Either of the joint use utility members, via the joint use utility client 125, or joint use utility owner 130 may access the joint use utility database 110, via communications network 115, to both update the joint use information and retrieve updated joint use information. Therefore, the end devices 120 may include, without limitation, any of a personal computer, smart phone, tablet, laptop computer, smart watch, or other mobile device. In various embodiments, the communications network 115 may include wired and wireless communication networks. In some embodiments, communications network 115 may represent multiple networks in the communication chain from joint use utility manager 105 to the one or more end devices 120 or joint use utility owner 130, or from the location server 135 to the one or more end devices 120. According to some embodiments, the communications network 115 might include a local area network ("LAN"), including without limitation a fiber network, or an Ethernet network; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol, or any other wireless protocol; or any combination of these or other networks.

In various embodiments, the joint use utility owner 130 may be a computer, server, or other device capable of communicating with the joint use utility manager 105 over communication network 115. Thus, the joint use utility owner 130 may be a computer system or other device controlled by a power company or other utility company that owns the joint use utility. Joint use utilities may include, but are not limited to, utility poles, light poles, utility boxes, utility trenches, cable conduits, pipes, and the like. In various embodiments, when the joint use utility owner 130 installs or creates a new joint use utility for a particular service area, the joint use utility owner 130 may create a new joint use information entry for the joint use utility in the joint use utility database 110 via the joint use utility manager 105. The joint use utility owner 130 may specify, without limitation, the type of joint use utility, location information for the joint use utility, job ticket information, joint use agreement members authorized to use the joint use utility, the next joint use agreement member to complete work on the joint use utility, among other relevant information. Similarly, the joint use utility owner 130 may update existing joint use information when an existing joint use utility must be repaired, upgraded, or replaced. Therefore, the joint use utility owner 130 may also update joint use information in the joint use utility database 110 via the joint use utility manager 105.

In various embodiments, the joint use utility owner 130 may further manually create job tickets via the joint use utility manager 105. The job ticket may be specific to one or a set of joint use utilities. The job ticket may specify to one or more joint use agreement members associated with the related one or more joint use utilities, various joint use information, including, without limitation, one or more steps to be completed, the order in which the joint use agreement members are to complete the steps, location information for the joint use utility, among other information. In one set of embodiments, the job ticket may be distributed to each of the one or more end devices 120, while in other sets of embodiments, the job ticket may only be distributed to the one or more end devices 120 when the joint use agreement member associated with the respective end device 120 is the next joint use agreement member to perform work on the joint use utility. In an alternative set of embodiments, the job ticket may be distributed automatically by the joint use utility manager 105 when joint use information is provided to the joint use utility database 110. In some embodiments, the job ticket may be created by the joint use utility owner 130, where the joint use utility owner 130 may specify to the joint use utility manager 105 what and how joint use information is used to generate the job ticket. In other embodiments, the job ticket may be automatically generated from joint use information by the joint use utility manager 105.

Accordingly, in various sets of embodiments, the joint use utility manager 105 may automatically push job tickets, newly created joint use information, or updates to the joint use information, to the one or more end devices 120. In some embodiments, each of the one or more end devices 120 may be associated with a respective joint use agreement member. Thus, job tickets, new joint use information, and updated joint use information may be pushed to, or retrieved by, the one or more end devices 120 according to whether the member of joint use utility agreement maintains lines and other attachments on the respective joint use utility. In various embodiments, the joint use utility client 125 may include, without limitation, any client-side application, firmware, or other software component for accessing joint use information, on the joint use utility database 110, through the joint use utility manager 105.

In various embodiments, the joint use utility manager 105 may include, without limitation, a server computer such as an app server or a web server. In some embodiments, the joint use utility manager 105 may send and receive communications from users, as input from a client-side interface, such as joint use utility client 125, or a client interface on the joint use utility owner 130 system. In other embodiments, a user interface may be provided from a web site or portal, e.g., by providing a set of one or more web pages, which might be displayed in a web browser running on the end device 120 via joint use utility client 125, and/or might be served by a web server (not shown in FIG. 1). In one set of embodiments, the joint use utility manager 105 might comprise the web server and/or be in communication with the web server, such that the joint use utility manager 105 provides data to the web server to be incorporated in web pages served by the web server for reception and/or display by a browser at the end device 120 or joint use utility owner 130 system.

In various embodiments, the one or more end devices 120, joint use utility manager 105, or combination of both, may be in communication with location server 135. Location server 135 may comprise an app or web server for providing location mapping and routing functions. For example, in various embodiments, the location server 135 may provide various types of maps, such as street maps, topological maps, satellite maps, photomaps, and the like. The location server 135 may further, without limitation, determine the location of a joint use utility or end device, generate navigation instructions, and draw route overlays on a map. In various embodiments, the location server 135 may receive or retrieve joint use information from the joint use utility manager 105 to generate maps populates with the locations of various joint use utilities based on their respective location information. In further embodiments, the location server 135 may receive or retrieve location information from an end device 120 about its respective physical location. In some embodiments, location information for each of the one or more end devices 120 may be provided, in real-time, as global positioning system (GPS) data. The location server may determine, from the GPS data, the respective physical locations of each of the one or more end devices 120.

According to one set of embodiments, a joint use utility owner 130 may provide joint use information to be entered into the joint use utility database 110. In various embodiments, based on the joint use information, the joint use utility owner 130, or alternatively, the joint use utility manager 105, may create a job ticket. The joint use utility manager 105 may then notify, based on the job ticket, the first member of the joint use agreement to complete work on the joint use utility over network 115. In one set of embodiments, a job ticket may be created for a pole transfer from one joint use utility to a new joint use utility. The first member of the joint use agreement to complete work may be associated with end device 120*a*. The joint use utility manager 105 may then transmit the new job ticket to the end device 120*a*. When the end device 120*a* receives the new job ticket, the joint use utility client 125 may notify the first member of the new job ticket. In some embodiments, prior to transmitting the new job ticket, the joint use utility manager 105 may first access the location server 135 to retrieve a map information, and determine the location of the joint use utility on a map. Once retrieved, the joint use utility manager 105 may include, as part of the job ticket, the map information indicating the location of the joint use utility on the map. In some further embodiments, the joint use utility manager 105 may also determine routing information from the physical location of the end device 120*a* to retrieve routing information from the location server 135, or alternatively, determine a route to the joint use utility itself. In other embodiments, the end device 120*a* may retrieve map information from the location server 135, based on the job ticket, and joint use utility client 125 may use the map information to determine the location of the joint use utility on the map. Similarly, in some embodiments, the end device 120*a* may further retrieve routing information from the location server 135, or alternatively, perform route planning to the joint use utility itself.

Once work for the job ticket has been completed by the first member of the joint use agreement, the first member may indicate that the work has been completed in various ways. In one set of embodiments, the first member may mark the job ticket status as completed through the joint use utility client 125 on end device 120*a*. The joint use utility client 125 may then update the status of the job ticket at the joint use utility database 110 through the joint use utility manager 105. In various embodiments, the joint use utility manager 105 may then determine the next member of the joint use agreement to complete work on the joint use utility. In some embodiments, the joint use utility manager 105 may transmit the job ticket to end device 120*n* associated with the next member of the joint use agreement to complete work on the joint use utility. In other arrangements, the joint use utility client 125 may directly forward the job ticket to the next member of the join use agreement to complete work on the job ticket, i.e. end device 120*n*, as directed by the joint use utility manager 105, or as determined by the joint use utility client 125 from the job ticket itself.

The above embodiments contrast with conventional prior art systems in that under the conventional system architectures and arrangements, the joint use agreement members, through their respective end devices, are individually responsible for retrieving new batches of job tickets and joint use information from a centralized database on their own accord. From the job ticket batch, each joint use agreement member would then, on their own, determine which job tickets they are associated with. The joint use agreement member would then be responsible for independently determining the locations of the joint use utilities using conventional means. Accordingly, to address the shortcomings and inefficiencies of prior art systems, the proposed solution provides a joint use utility manager 105 to receive joint use information, create and manage job tickets, and identify and communicate directly with end devices 120. By utilizing this type of system architecture, many of the above described inefficiencies of the prior art systems are addressed. Furthermore, by providing a joint use utility manager 105 that is communicatively coupled to a location server, the joint use utility manager 105 is able to identify the locations of joint use agreement members, and communicate mapping and routing information to the identified end devices 120, whereas conventional prior art systems are unable to support such capabilities.

Figure 2:
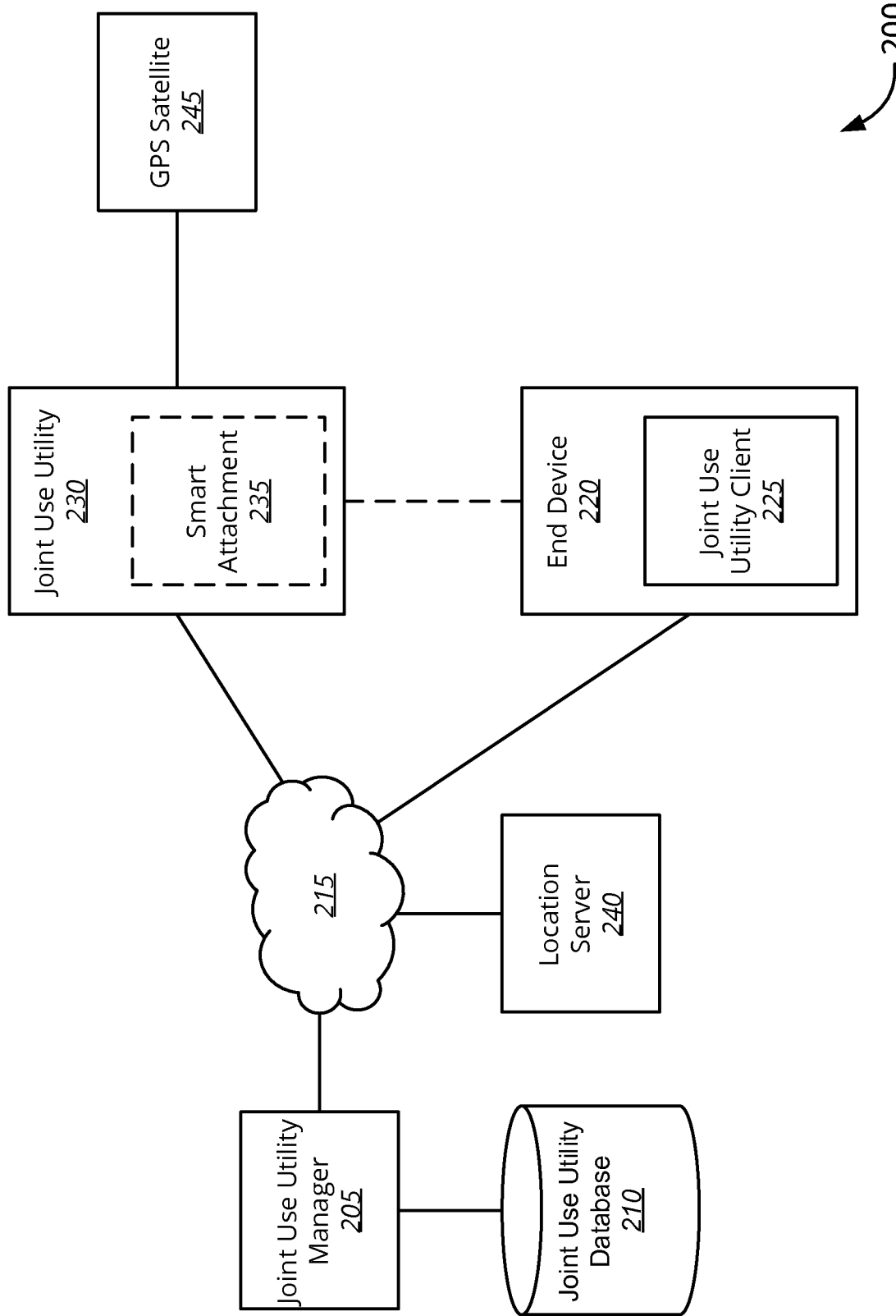
FIG. 2 is a system block diagram of an alternative architecture for a joint use utility management system, in accordance with various embodiments.

FIG. 2 illustrates an alternative arrangement for a joint use utility management system 200, in accordance with various embodiments. The system 200 includes a joint use utility manager 205, joint use utility database 210, network 215, one or more end devices including end device 220 having a joint use utility client 225, a joint use utility 230 having an optional smart attachment 235, location server 240, and a GPS satellite 245.

Similar to the system 100 of FIG. 1, a joint use utility manager 205 is communicatively coupled to a communications network 215 through which the joint use utility manager 205 may communicate with the joint use utility client 225 of end device 220. However, in addition to end device 220, the joint use utility manager 205 may further communicate directly with joint use utilities including joint use utility 230. In some embodiments, the joint use utility 230 may include an optional smart attachment 235 through which communications with the joint use utility manager 205 may be conducted.

In one set of embodiments, joint use utility 230 may be a new, replacement, or upgrade for an existing joint use utility. According to various embodiments, the joint use utility owner of the joint use utility 230 may further provide the optional smart attachment 235. The smart attachment 235 may be communicatively coupled, via communications network 215, to the joint use utility manager 205 or one or more end devices including end device 220.

In various embodiments, the smart attachment may include or have access to joint use information regarding the joint use utility 230, which it may then transmit over communications network 215. In this manner, the smart attachment 235 may allow the joint use utility 230 to report its own joint use information to the joint use utility manager 205 or joint use utility database 210. In one set of embodiments, the smart attachment 235 may further include a GPS receiver in communication with one or more GPS satellite(s) 245. Thus, the smart attachment 235 may be able to identify its location and provide location information regarding the joint use utility 230 to the joint use utility manager 205 or joint use utility database 210. In some sets of embodiments, the joint use utility owner may independently provide joint use information regarding the joint use utility 230 to the joint use utility manager 205, while the smart attachment 235 provides only location information regarding the joint use utility 230. In other sets of embodiments, the joint use utility owner may provide joint use information to the smart attachment 235 to relay to the joint use utility manager 205.

In a further set of embodiments, the joint use utility 230 and smart attachment 235 may directly establish communications with a joint use utility client 225 of end device 220. The smart attachment 235 may identify, via the joint use information, that a first member of the joint use agreement to complete work on the joint use utility 230. The smart attachment 235 may determine, through the joint use utility database 210, that end device 220 is associated with the first member of the joint use agreement. Thus, in some embodiments, the smart attachment 235 may be able to establish direct communications with the joint use utility client 225 of end device 220. In other embodiments, the smart attachment 235 may establish a connection to the joint use utility client 225 through communications network 215. In some further embodiments, the smart attachment 235 may further be operable to generate its own job tickets from joint use information, rather than relying on joint use utility manager 205.

In various embodiments, the smart attachment 235 may further be in communication with the location server 240, through network 215, to further identify the location of the joint use utility 230 on a map. In other embodiments, the joint use utility manager 205 may generate job tickets based on joint use information received from the joint use utility owner, or via the smart attachment 235.

As described with respect to FIG. 1, the job ticket may specify to one or more joint use agreement members associated with the related one or more joint use utilities, various joint use information, including, without limitation, one or more steps to be completed, the order in which the joint use agreement members are to complete the steps, location information for the joint use utility, among other information.

In various embodiments, the joint use utility manager 205 may include, without limitation, a server computer such as an app server or a web server. In some embodiments, the joint use utility manager 205 may send and receive communications from users, as input from a client-side interface, such as joint use utility client 225, the smart attachment 235, or a client interface utilized by the joint use utility owner. In one set of embodiments, the joint use utility manager 205 might comprise the web server and/or be in communication with the web server, such that the joint use utility manager 205 provides data to the web server to be incorporated in web pages served by the web server for reception and/or display by a browser at the end device 220 or system utilized by the joint use utility owner.

In one set of embodiments, the joint use utility manager 205 may automatically push any of job tickets, newly created joint use information, or updates to the joint use information, to end device 220. In some alternative embodiments, the smart attachment 235 may be responsible for direct communications transmitted to and received from the end device 220. Thus, the joint use utility manager 205 may receive all updates to the joint use information from smart attachment 230.

In various embodiments, the smart attachment 235 may further be able to determine if and whether an end device associated with a member of the joint use agreement is within a pre-defined range of the joint use utility 230. The smart attachment 235 may then transmit, in response to determining that an end device is within the pre-defined range, a job ticket to the end device. In various embodiments, the smart attachment 235 may identify that the member of the joint use agreement has work to complete on the joint use utility 230, or more specifically whether the member is the next member to complete work on the joint use utility 230. The smart attachment may then establish a direct connection to the end device associated with the member of the joint use agreement, such as through a joint use utility client 225.

In one set of embodiments, when a member of the joint use agreement has completed their work for the job ticket, the member may indicate that the work has been completed directly to the smart attachment 235, which in turn may notify the joint use utility manager 205. In various embodiments, the joint use utility manager 205 may identify the next member of the joint use agreement to complete work on the joint use utility. In some embodiments, the joint use utility manager 205 may transmit the job ticket to directly to an end device associated with the next member of the joint use agreement to complete work on the joint use utility 230. Alternatively, the joint use utility manager 205 may identify the next member of the joint use agreement to complete work on the joint use utility 230 to the smart attachment 235, thus allowing the smart attachment to establish a connection with the end device of the next member of the joint use agreement to complete work.

Figure 3:
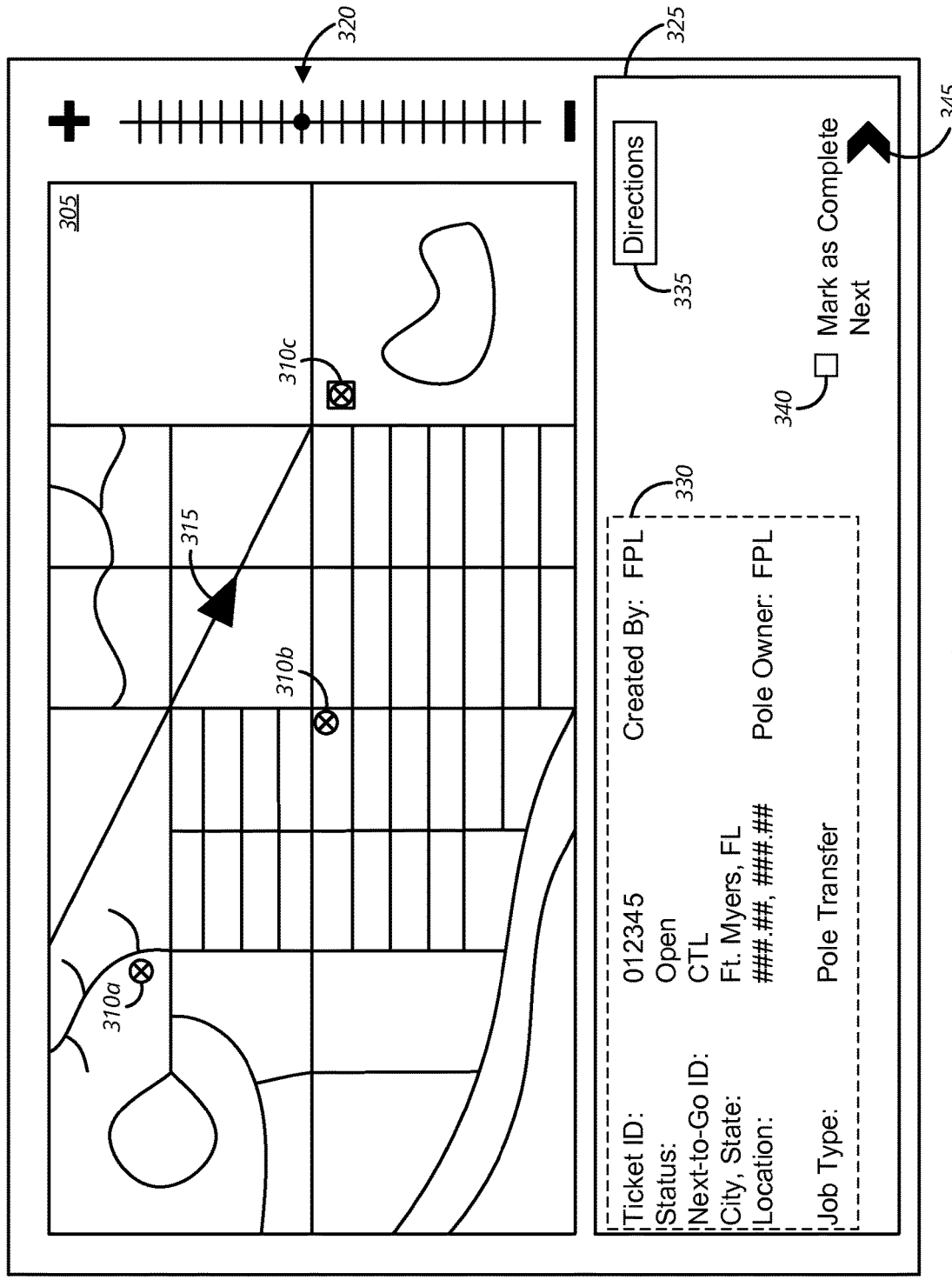
FIG. 3 is a screen capture of an end device interface for a joint use utility management system, in accordance with various embodiments.

FIG. 3 depicts an exemplary user interface for viewing and editing job tickets 300 on an end device, in accordance with various embodiments. The following embodiments are described with further reference to elements in FIGS. 1 & 2. According to a set of embodiments, the job ticket 300 may include a map 305 display region showing streets and roadways, the locations of joint use utilities 310a, 310b, 310c (310 collectively), a positional indicator 315, a zoom slider 320 for the map 305, a job ticket information display area 325 containing various joint use information 330, a directions button 335 for obtaining navigation directions, a mark as complete box 340, and next button 345.

In various embodiments, the job ticket screen 300 may be presented on an end device 120, 220 by a joint use utility client 125, 225. The joint use utility client 125, 225 may generate the map region 305 based on information retrieved from one or more of a location server 135, 240, joint use utility manager 105, 205, smart attachment 235, GPS satellite 245, end device 120, 220, or joint use utility owner 130. For example, in various embodiments, the locations of joint use utilities 310a, 310b, and 310c may be determined from joint use information retrieved from the joint use utility database 110, 210 via joint use utility manager 105, 205. In some alternative sets of embodiments, a joint use utility 230 may self-report its location information via smart attachment 235. Based on location information for each of the joint use utilities, the joint use utility client 225 may then retrieve map information from the location server 135, 240 to identify and determine the locations of joint use utilities 310a, 310b, and 310c on the map 305. The positional indicator 315 may be placed in the map region 305 in a similar manner, by identifying the location information for the end device 120, 220 and identifying its location in the map region 305. In some embodiments, the positional indicator 315 may be updated in real-time to reflect the current position of the end device 120, 220.

In an alternative set of embodiments, the joint use utility manager 105, 205 may, based on the joint use information, generate a map populated with joint use utility location indicators 310a, 310b, 310c, and transmit the map 305 to each end device 120, 220. In various embodiments, the joint use utility manager 105, 205 may further identify which joint use utilities are relevant to the joint use agreement member associated with a particular end device 120, 220 to which the map 305 is sent. The joint use utility manager 105, 205 may then populate the map 305 with joint use utility location indicators 310a, 310b, 310c of only the joint use utilities with which the joint use agreement member is associated with or has work to perform on. Thus, the joint use agreement member may view a location in the map region 305 as desired, on the end device 120, 220 via the joint use utility client 125, 225. In various embodiments, a user of the end device 120, 220 may move to different locations of the map by direct manipulation of the map region 305, such as by clicking and dragging or touch input. A user may further zoom in or out of a region utilizing the zoom slider 320, or again by touch manipulation, as will be familiar to those skilled in the art.

The job ticket screen interface may further include a job ticket information area 325 including various details about the job ticket, including joint use information 330 particular to the joint use utility in the job ticket. For example, job ticket information 330 may include a ticket identification for the job ticket, a status of the job ticket for the joint use agreement member associated with the end device 120, 220, a next-to-go identifier identifying the next joint use agreement member to perform work on the joint use utility, the city and state in which the joint use utility is located, geographic coordinates of the joint use utility, the creator of the job ticket, the owner of the joint use utility, and a job type indicating the type of work to be completed. Thus, in this example, the job ticket is given the identifier "012345," the job ticket status being "open." The next-to-go ID identifies the next joint use member to go on the job ticket as "CTL." The joint use information further identifies that the joint use utility is located in "Ft. Myers, Fla.," and further provides geographic coordinates as "###.##, ###.##," indicating the latitude and longitude of the joint use utility. The job type specifies that the job ticket is a pole transfer, where a joint use agreement member's attachments, lines, and equipment must be transferred from an existing pole to the new utility pole. The joint use information 330 may further specify that the job ticket was created by "FPL" and that the utility pole owner is likewise "FPL."

In one set of embodiments, a user of the end device 120, 220 may view job ticket information for a joint use utility 310a, 310b, 310c by selecting the joint use utility in the map region 305. For example, joint use utility indicator 310c is selected, and joint use information 330 regarding the joint use utility at joint use utility indicator 310c is presented in the job ticket information area 325. In some embodiments, the user of end device 120, 220 may view job ticket information for joint use utilities at joint use utility indicators 310a, 310b by selecting the joint use utility indicators 310a, 310b respectively. In one set of embodiments, only joint use utilities 310a, 310b, 310c associated with the joint use agreement member may be displayed in the map region 305. In other sets of embodiments, the map region 305 may display all joint use utilities, and the joint use utility indicators 310a, 310b, 310c associated with the joint use agreement member may be differentiated by, without limitation, color coding, symbol, shape, text, or by providing the option to hide the joint use utility indicators of that are not associated with the joint use agreement member.

In various embodiments, a directions button 335 may also be provided to allow a user of the end device 120, 220 to obtain textual directions to the selected joint use utility indicator 310a, 310b, 310c. In one set of embodiments, the textual directions may be displayed in the job ticket information area 325, replacing the joint use information 330. In other embodiments, the map region 305 may overlay a route to the selected joint use utility indicator 310.

A user of the end device may indicate that work on the job ticket has been completed via the mark as complete button 340. By selecting the mark as complete button, the joint use utility client 125, 225 may update the status of the job ticket from "open" to, for example, a status indicating that the work has been completed, such as "completed" or "closed." In various embodiments, the joint use utility client 125, 225 may notify the joint use utility manager 105, 205 of the updated status of the job ticket, and update joint use information in the joint use utility database 110, 210 accordingly. In one set of embodiments, the joint use utility manager 105, 205 may identify the next joint use agreement member to perform work on the joint use utility, and generate and transmit a job ticket to an end device 120, 220 associated with the next joint use agreement member to complete work on the joint use utility. In another set of embodiments, the end device 120, 220 of the current joint use agreement member may directly transmit the job ticket to an end device 120, 220 of the next member of the joint use agreement to perform work on the joint use agreement. In a further set of embodiments, in response to the job ticket being marked as complete via the mark as complete button 340, the end device 120, 220 may directly transmit the status of the job ticket to a smart attachment 235 of the joint use utility 230 upon which work was being performed. Then smart attachment 235 may then update the status of the job ticket via the joint use utility manager 105, 205, and transmit the job ticket to the next member of the joint use agreement to perform work on the joint use utility 230.

After checking the mark as complete button 340, the user of the end device 120, 220 may review job ticket information for the next job ticket via the next button 345. The next button 345 may then retrieve the next job ticket awaiting completion by the joint use agreement member, and corresponding joint use information 330, and an update of the map region 305 to show the location of the next joint use utility. In various embodiments, the next job ticket may be retrieved following a pre-determined order, specified by any of the joint use utility owner 130, joint use utility manager 105, 205, smart attachment 235, the joint use agreement members or user of the end device 120, 220. In other embodiments, the next job ticket may be retrieved dynamically according to proximity of the end device 120, 220 to a joint use utility having an open job ticket for the joint use agreement member. For example, in one set of embodiments, when work has been completed on the job ticket for the joint use utility at joint use utility indicator 310c, the next button may cause the end device to open the job ticket for a joint use utility at joint use utility indicator 310b, the joint use utility indicator 310b being the next closest joint use utility indicator to the end device 120, 220 from joint use utility indicator 310c. In other embodiments, the job tickets may be retrieved according to which joint use utilities are expected to be encountered following a pre-planned route, as determined by any of the joint use utility manager 105, 205, joint use utility owner 130, user of the end device 120, 220, or smart attachment 235.

Figure 4A:
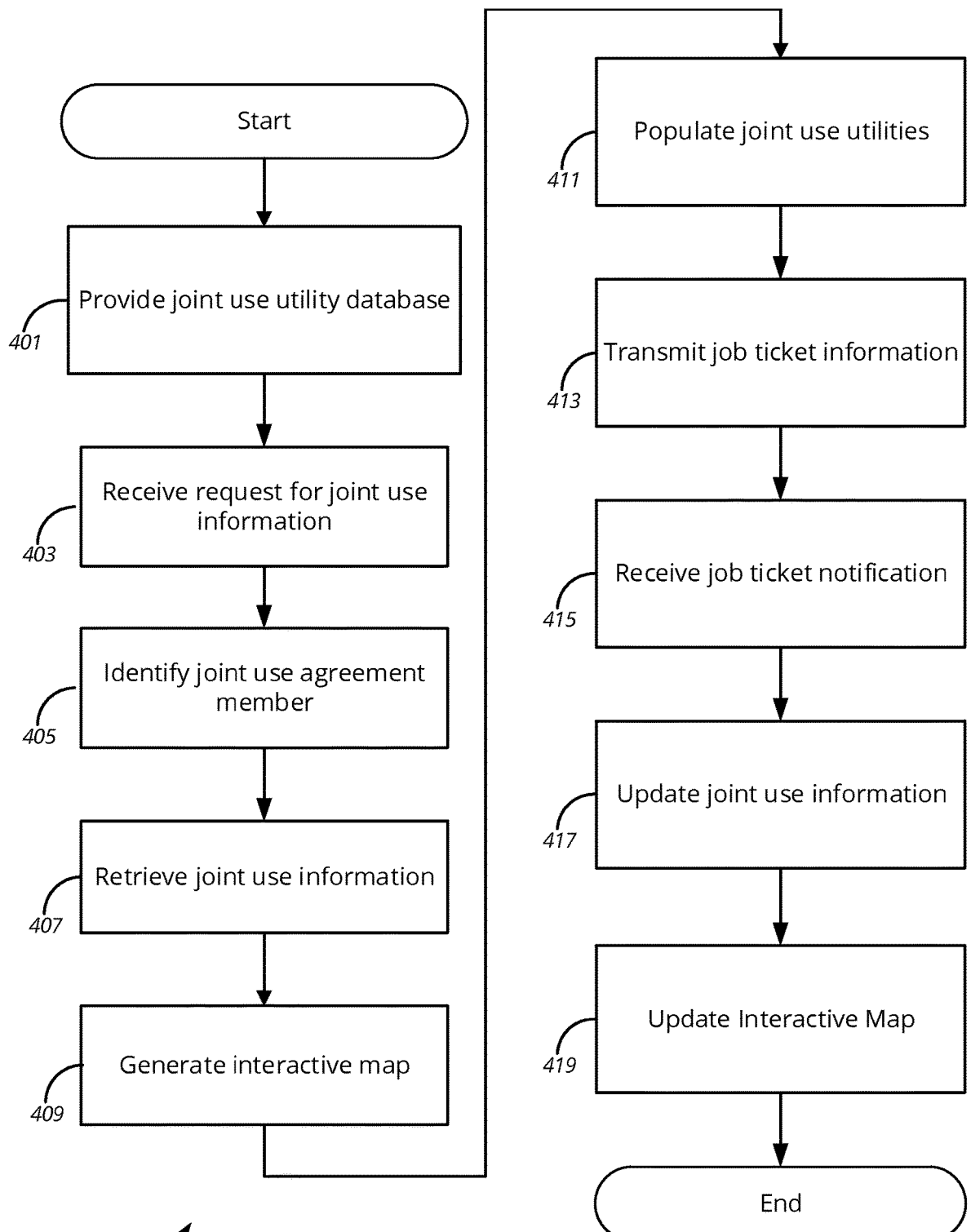
FIG. 4A is a flow diagram of a method for a joint use utility management system, in accordance with various embodiments.

FIG. 4A is a flow diagram of a method 400A for a joint use utility management system, in accordance with various embodiments. The method 400 begins, at block 401, by providing a joint use utility database. In various embodiments, a joint use utility database is provided to store various joint use information and job ticket information, as provided by any of the joint use utility owner, joint use agreement member, and smart attachments of the joint use utilities. Joint use information may include, without limitation joint use utility owner information, location information about the joint use utility, joint use agreement member information, service area information, job ticket information, and other data relevant to the respective joint use utility. The joint use utility database may be in communication with a joint use utility manager and accessible, via the joint use utility manager, by various end devices, smart attachments of joint use utilities, and joint use utility owners.

At block 403, a request for open job tickets is received by the joint use utility manager. In various embodiments, a user of an end device of a particular joint use agreement member may transmit a request for all open job tickets with which the joint use agreement member is associated with. As used here, an open job ticket may refer to any job tickets associated with the joint use agreement member having an "open" status, in which work is still pending on the joint use utility respectively associated with the job ticket. In one set of embodiments, the request may be generated and transmitted to the joint use utility manager in response to, or as part of an initialization procedure, for a joint use utility client on the end device. In some embodiments, a user may further log into the joint use utility client to request and access the job tickets associated with the joint use agreement member. In other embodiments, the joint use utility manager may identify that a joint use utility client application has been initialized, where the initialization of the joint use utility client application on the end device is itself the request for open job tickets.

At block 405, the joint use utility manager may identify the joint use agreement member based on the request for open job tickets. In one set of embodiments, the joint use utility manager may identify the joint use agreement member based on the end device from which the request originated. For example, in some embodiments, an end device identifier may be associated with the joint use agreement member. The end device identifier may include, without limitation, a serial number such as an electronic serial number (ESN) or international mobile equipment identity (IMEI), a hardware address such as a media access control (MAC) address, network address, a user name, ID or profile, or other suitable techniques known to those having ordinary skill in the art.

At block 407, the joint use utility manager may retrieve joint use information for each joint use utility with which the joint use agreement member is associated. Thus, each joint use utility may have a respective set of joint use information. In various embodiments, the joint use utility manager may retrieve the joint use information from the joint use utility database. The joint use information may be utilized, by the joint use utility manager, to generate a job ticket for each respective joint use utility. In one set of embodiments, the joint use utility database may further include job ticket information regarding existing job tickets for one or more joint use utilities. This information may be included as part of the joint use information for the particular joint use utility. In these situations, in some embodiments, the joint use utility manager may then only retrieve joint use information for joint use utilities that do not already have existing job tickets.

At block 409, the joint use utility manager may generate an interactive map, based on the joint use information. According to various embodiments, the joint use information may specify location information regarding the joint use utility. Location information may include, without limitation, geographic coordinates specifying the latitudinal and longitudinal positions of the joint use utility. In one set of embodiments, the joint use utility manager may then retrieve map information from a dedicated location server. In some embodiments, the location server may be a third party provider of map or GPS services. Thus, at block 411, based on the location information and map information, the joint use utility manager may be able to generate an interactive map populated with the locations of each of the one or more joint use utilities having open job tickets. In various embodiments, the interactive may further include joint use information regarding each respective joint use utility, in addition to the location information. Accordingly, in some embodiments, the interactive map itself may include job ticket information for each of the open job tickets of the one or more joint use utilities.

At block 413, the job ticket information is transmitted, by the joint use utility manager, to the requesting end device. According to one set of embodiments, the entire interactive map itself may be transmitted to the end device. In some other embodiments, end device may already include a previous version of the interactive map. Thus, the joint use utility manager may only transmit job ticket information with which to update the interactive map already on the end device. In various embodiments, the joint use utility manager may transmit the job ticket information, via a communications network, a direct connection to the end device, or to a smart attachment. When the job ticket information is transmitted to a smart attachment, the smart attachment may then forward the job ticket information, either over the communications network, or directly to the end device.

At block 415, the joint use utility manager may receive a job ticket notification. After work on a job ticket has been completed, the end device may . . . In various embodiments, the job ticket notification may indicate a status of the job ticket after work has been completed by the joint use agreement member. In some arrangements, the job ticket notification may be received from the end device, while in other configurations a smart attachment may be responsible for receiving the job ticket notification from the end device and forwarding the job ticket notification to the joint use utility manager. Upon receipt, at block 417, the joint use utility manager may update the joint use information, including a status of the job ticket, in the joint use utility database. In some further embodiments, the next joint use agreement member to perform work on the joint use utility may be specified. The joint use agreement manager may accordingly generate a job ticket for the next joint use agreement member to go. At block 419, the interactive map may also be updated to reflect the work completed by the member of the joint use agreement. For example, if no further work remains to be completed on the joint use utility, the joint use utility itself may be removed from the map, or otherwise indicated on the interactive map that work has been completed for the particular joint use utility.

Figure 4B:
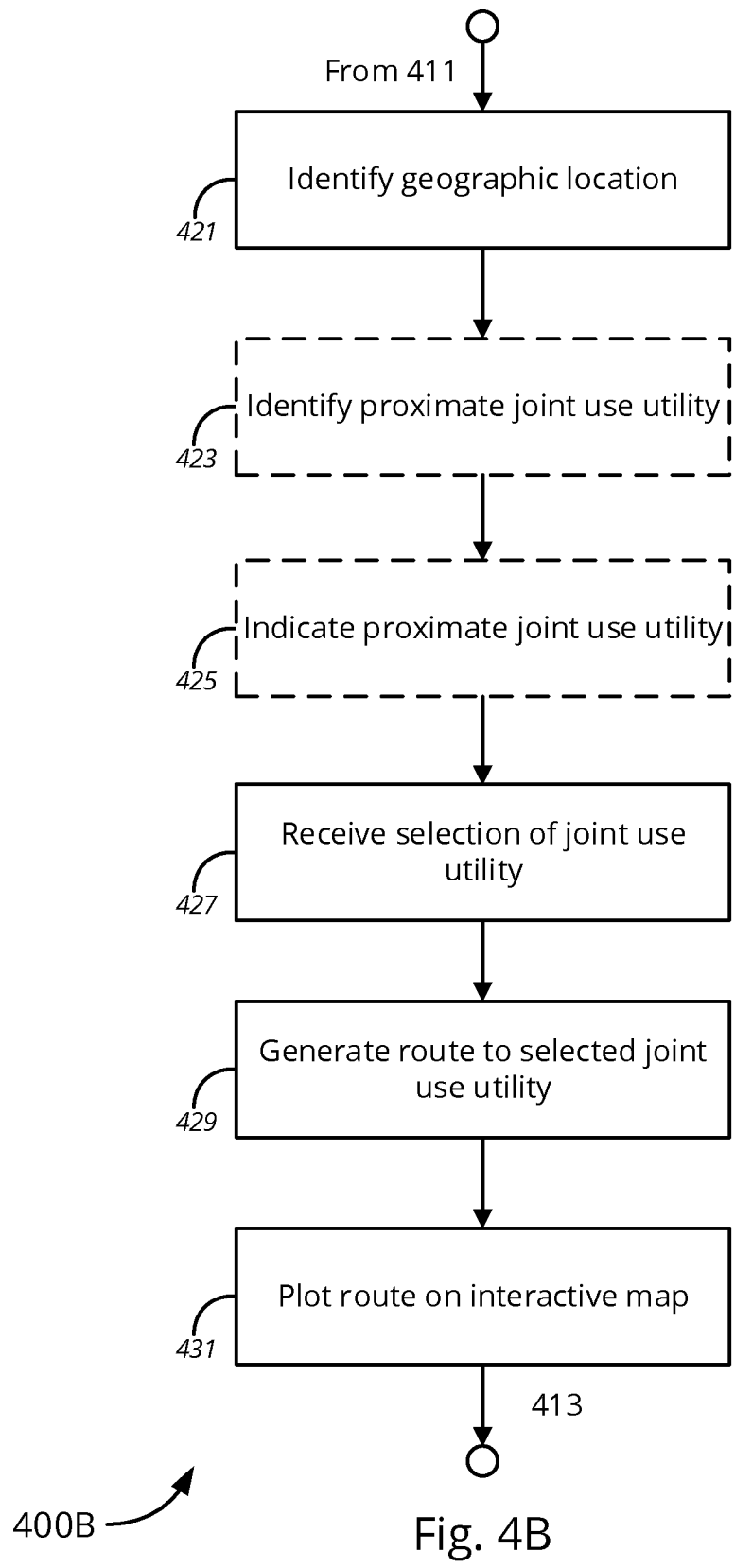
FIG. 4B is a flow diagram of additional processes in a method for a joint use utility management system, in accordance with various embodiments.

FIG. 4B is a flow diagram of mapping and routing processes in a method 400B for a joint use utility management system, in accordance with various embodiments. The method 400B begins after, at block 411, the joint use utilities are populated on the interactive map. At block 421, the geographic location of the end device may be identified. In one set of embodiments, the end device may include a GPS receiver through which it may communicate with one or more GPS satellites to determine its location. In some embodiments, the end device may determine then report its location to the joint use utility manager for inclusion of a positional indicator on the interactive map. In other embodiments, the end device may use its location information to create a positional indicator on the interactive map locally at the end device itself.

At block 423, a proximate joint use utility is identified on the interactive map. In various embodiments, one or more joint use utilities in close physical proximity to the end device may be identified as a proximate joint use utility. Proximate joint use utilities may include joint use utilities that are within a predetermined threshold range from the location of the end device. In one set of embodiments, the joint use utility manager may identify the proximate joint use utilities, while in other embodiments, a joint use utility client running on the end device may be able to make this determination.

Then, at block 425, the proximate joint use utility may be indicated on the interactive map. In one set of embodiments, the joint use utility manager may take the identified proximate joint use utilities and indicate them on the interactive map. A proximate joint use utility may be differentiated from other joint use utilizes by, without limitation, color, symbol, shape, patterning, indicator behavior such as blinking, or as indicated in text. In some embodiments, the joint use utility manager may update the interactive map with an indication of the proximate joint use utility, and transmit an updated interactive map to the end device. In other embodiments, the joint use utility client may itself be able to indicate the proximate joint use utilities on the interactive map locally on the end device itself.

At block 427, a selection of a joint use utility may be received. In various embodiments, a user may manually select one or more joint use utilities on the interactive map via the joint use utility client. In other embodiments, the joint use utility may be selected according to a pre-determined series of one or more joint use utilities, as specified by a user of the end device. Thus, the selected joint use utility in this case may be the first joint use utility in the series of one or more joint use utilities. Accordingly, in one set of embodiments, the joint use utility client may transmit the selection to a joint use utility manager. At block 429, a route to the selected joint use utility may be generated. In one set of embodiments, the joint use utility manager may determine a route to the selected joint use utility by providing location information for the end device and selected joint use utility to a location server. The location server may then generate a route, from the end device, to the joint use utility. In another set of embodiments, the end device may be able to directly communicate with the location server to transmit location information about itself and a selected joint use utility to the location server. The end device may then receive routing information from the location server.

At block 431, the route from the end device to the selected joint use utility may be plotted on the interactive map. In various embodiments, the location server may generate routing information indicating a route from the position of the end device to the selected joint use utility. The routing information may then be used to overlay a route over the interactive map. For example, the route overlay may include, without limitation, colored lines, bolded lines, patterned lines, or combination of these techniques to indicate the route to be taken by the user of the end device. In one set of embodiments, the joint use utility manager may overlay the route onto the interactive map and transmit the updated interactive map with the route overlay to the joint use utility client. In other embodiments, the joint use utility client may use the routing information to create the route overlay itself. After the route has been plotted, the method 400B may proceed to the job ticket information retrieval process, at block 413.

Figure 4C:
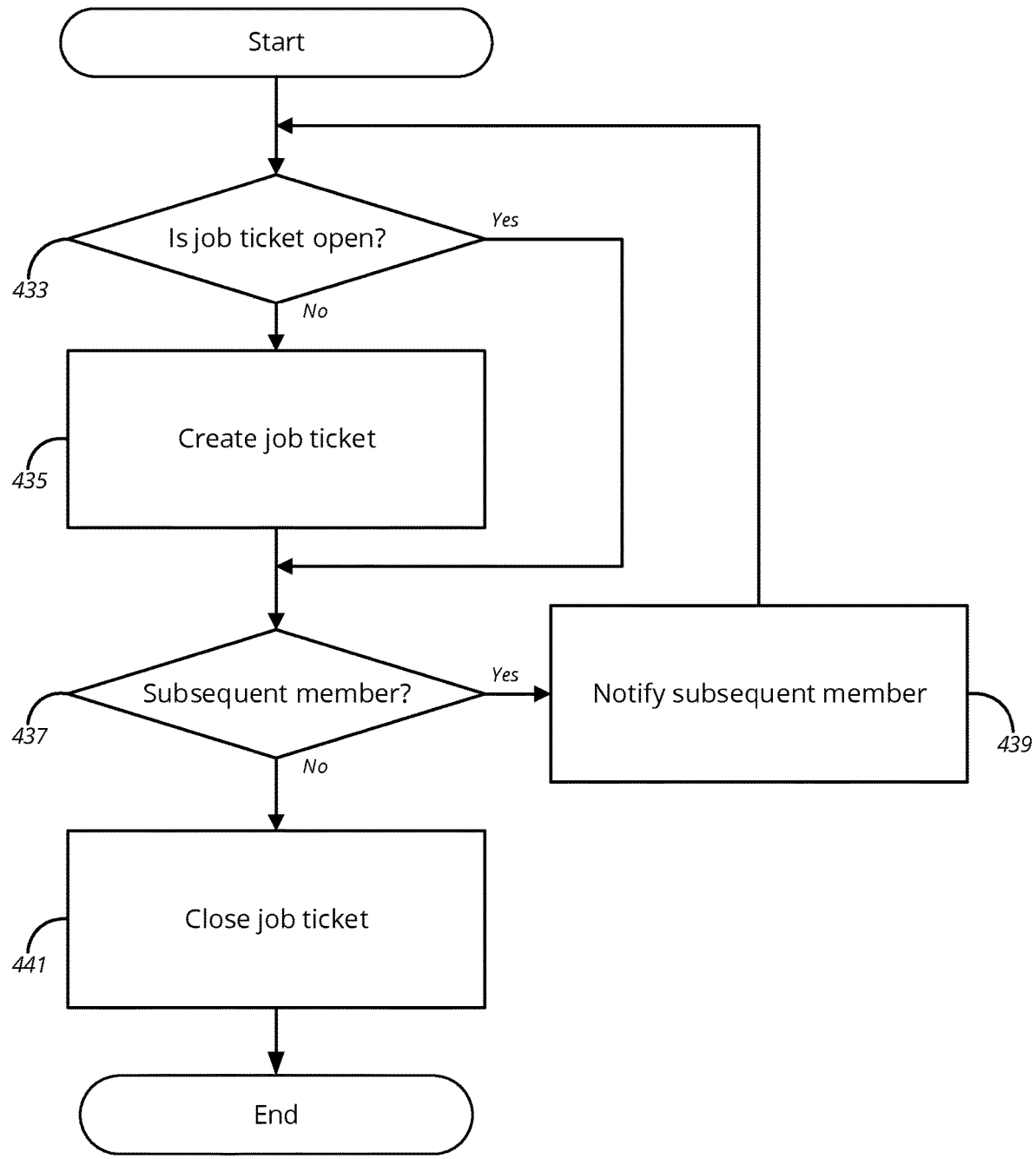
FIG. 4C is a flow diagram of job ticket handling processes in a method for a joint use utility management system, in accordance with various embodiments.

FIG. 4C is a flow diagram of a job ticket handling process in a method 400C for a joint use utility management system, in accordance with various embodiments. The method begins, at decision block 433, by determining whether there is a job ticket open for the joint use agreement member for a particular joint use utility. In various embodiments, a job ticket notification may be submitted to the joint use utility manager by the joint use utility owner or joint use agreement member, via the joint use utility client, or otherwise. The job ticket notification may be a request to complete work on a joint use utility or to update joint use information regarding the joint use utility. Thus, based on the job ticket notification, the joint use utility manager may determine whether there is a job ticket open for the particular joint use utility. If there is not an existing job ticket for the joint use utility, the joint use utility manager may, at block 435, create a new job ticket. The new job ticket may specify job ticket information specifying details about the particular job ticket. As discussed above, job ticket information may include joint use information regarding the joint use utility in question, as well as any additional information relating to the job ticket. For example, the job ticket information may include a ticket identification for the job ticket, a status of the job ticket for the joint use agreement member associated with the end device, a next-to-go identifier identifying the next joint use agreement member to perform work on the joint use utility, the city and state in which the joint use utility is located, geographic coordinates of the joint use utility, the creator of the job ticket, the owner of the joint use utility, and a job type indicating the type of work to be completed.

If an existing job ticket has an open status, the joint use utility manager, at decision block 437, determines whether there is a subsequent joint use agreement member still having to complete work on the job ticket. In various embodiments, the job ticket information regarding the job ticket may specify an order of joint use agreement member having to completed work on the joint use utility. Thus, if there is a subsequent joint use agreement member still having to complete work for the job ticket, the joint use utility manager may, at block 439, identify the subsequent joint use agreement member to go and notify the subsequent joint use agreement member of the open job ticket. In various embodiments, when work has been completed by the subsequent joint use agreement member, they may send a job ticket notification back to the joint use utility manager indicating, in the status of the job ticket, that work has been completed by that joint use agreement member. The joint use utility manager may then resume the process from decision block 433, as described above.

If, at decision block 437, the joint use utility manager determines that no subsequent joint use agreement member remains on the job ticket, then at block 441, the joint use utility manager may close the job ticket. In various embodiments, the joint use utility manager may update the status of the job ticket as completed or closed for all members. The joint use utility manager may correspondingly update the job ticket information and joint use information at a joint use utility database to reflect the status of the job ticket and to reflect changes in the joint use information as a result of the work completed on the job ticket.

Figure 5:
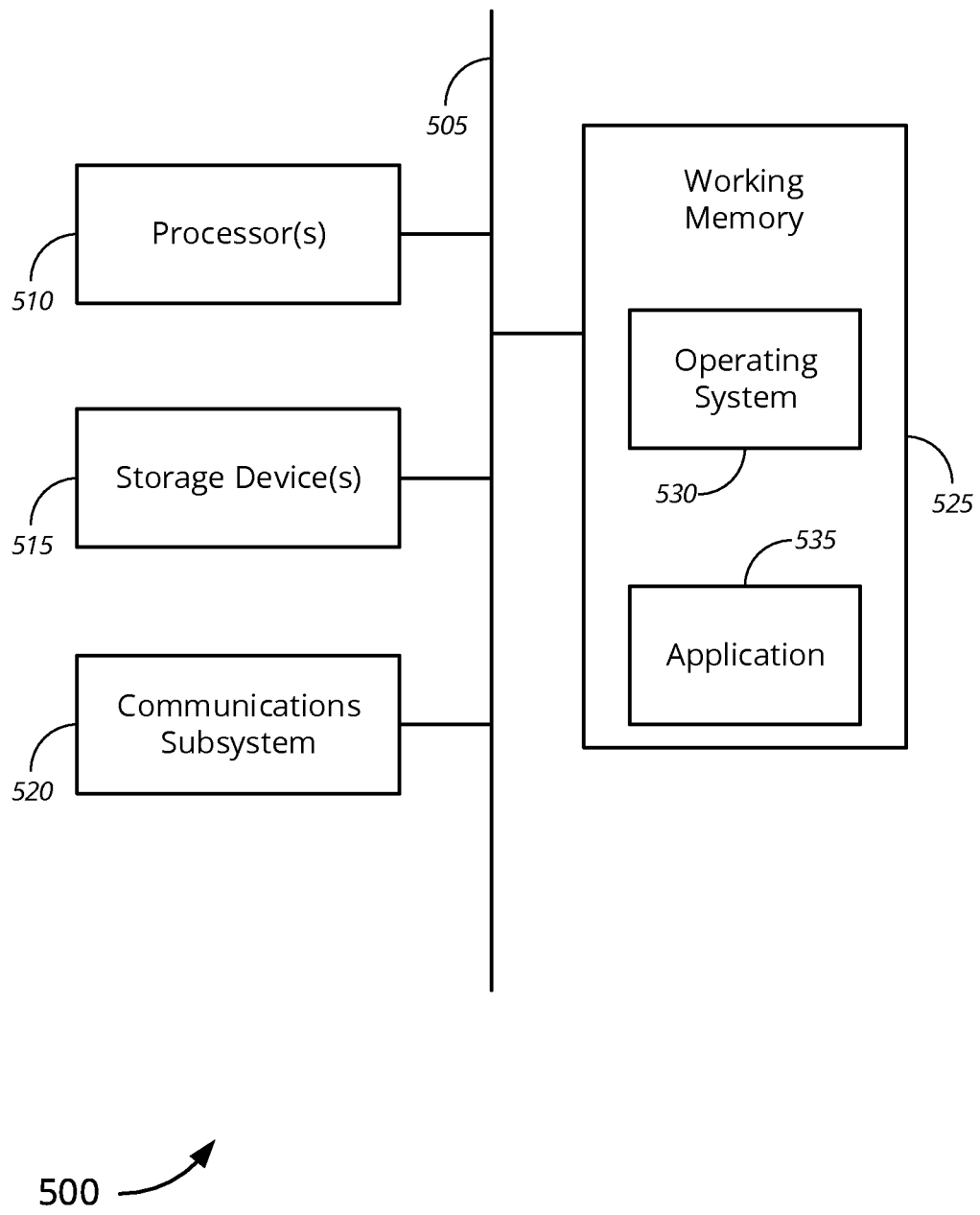
FIG. 5 is a schematic block diagram of computer hardware for a joint use utility manager, in accordance with various embodiments.

FIG. 5 is a schematic block diagram of a computer architecture for a joint use utility manager, in accordance with various embodiments. FIG. 5 provides a schematic illustration of one embodiment of a computer system 500 that can perform the methods provided by various other embodiments, as described herein, and/or can perform the functions joint use utility manager, smart attachment, end device, or any other computer systems as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or integrated manner.

The computer system 500 includes a plurality of hardware elements that can be electrically coupled via a bus 505 (or may otherwise be in communication, as appropriate). The hardware elements may include one or more processors 510, including, without limitation, one or more general-purpose processors and/or one or more special-purpose processors (such as digital signal processing chips, graphics acceleration processors, and/or the like). In general, embodiments can employ as a processor any device, or combination of devices, that can operate to execute instructions to perform functions as described herein. Merely by way of example, and without limitation, any microprocessor (also sometimes referred to as a central processing unit, or "CPU") can be used as a processor, including without limitation one or more complex instruction set computing ("CISC") microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing ("RISC") microprocessors, such as the IBM Power™ line of processors, processors employing chip designs by ARM Holdings™, and others can be used in many embodiments. In further embodiments, a processor might be a microcontroller, embedded processor, embedded system, system on a chip ("SoC") or the like.

As used herein, the term "processor" can mean a single processor or processor core (of any type) or a plurality of processors or processor cores (again, of any type) operating individually or in concert. Merely by way of example, the computer system 500 might include a general-purpose processor having multiple cores, a digital signal processor, and a graphics acceleration processor. In other cases, the computer system might 500 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors 510 have been described herein for illustrative purposes, these examples should not be considered limiting.

The computer system 500 may further include, or be in communication with, one or more storage devices 515. The one or more storage devices 515 can comprise, without limitation, local and/or network accessible storage, or can include, without limitation, a disk drive, a drive array, an optical storage device, a solid-state drive, flash-based storage, or other solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including, without limitation, various file systems, database structures, or the like.

The computer system 500 might also include a communications subsystem 520, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 520 may permit data to be exchanged with a customer premises, residential gateway, authentication server, a customer facing cloud server, network orchestrator, host machine servers, other network elements, or combination of the above devices, as described above. Communications subsystem 520 may also permit data to be exchanged with other computer systems, and/or with any other devices described herein, or with any combination of network, systems, and devices. According to some embodiments, the network might include a local area network ("LAN"), including without limitation a fiber network, or an Ethernet network; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol, or any other wireless protocol; or any combination of these or other networks.

In many embodiments, the computer system 500 will further comprise a working memory 525, which can include a RAM or ROM device, as described above. The computer system 500 also may comprise software elements, shown as being currently located within the working memory 525, including an operating system 530, device drivers, executable libraries, and/or other code. The software elements may include one or more application programs 535, which may comprise computer programs provided by various embodiments, and/or may be designed to implement methods and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 530 and/or other code, such as an application program 535) contained in the working memory 525. Such instructions may be read into the working memory 525 from another computer readable medium, such as one or more of the storage device(s) 515. Merely by way of example, execution of the sequences of instructions contained in the working memory 525 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 515. Volatile media includes, without limitation, dynamic memory, such as the working memory 525.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 520 (and/or components thereof) generally will receive the signals, and the bus 505 then might carry the signals (and/or the data, instructions, etc. carried by the signals) to the processor(s) 510, or working memory 525, from which the processor(s) 510 retrieves and executes the instructions. The instructions received by the working memory 525 may optionally be stored on a storage device 515 either before or after execution by the processor(s) 510.

According to a set of embodiments, the computer system 500 may be a joint use utility manager having access to, and in communication with, one or more joint use utility clients running on one or more end devices respectively, a device or system associated with a joint use utility owner, smart attachment on a joint use utility, a joint use utility database, and location server. In various embodiments, each of the one or more end devices, an end device of a joint use owner, location server, or smart attachment may themselves include one or more hardware elements similar to computer system 500.

According to various sets of embodiments, the computer system 500 may include computer readable media, having stored thereon a plurality of instructions, which, when executed by the processor 510, allows the computer system 500 to perform the following functions. In various embodiments, the computer system may receive a request, via the communications subsystem 520, for open job tickets associated with a first member of a joint use agreement, from a joint use utility client of running on an end device associated with the first member of the joint use agreement. The computer system 500 may also be in communication with a joint use utility database, via communications subsystem 520. In response to receiving the request for open job tickets, the computer system 500, the computer system 500 may retrieve, from the joint use utility database, a list of joint use utilities associated with the first member. In one set of embodiments, the computer system 500 may determine whether job tickets already exist for each of the joint use utilities, or whether a new job ticket needs to be created. The computer system 500 may further include instructions to generate an interactive map populated with indicators corresponding to a location of each of the joint use utilities in the list of joint use utilities. The computer system 500 may then transmit the interactive map to the requesting end device. The computer system 500 may further transmit job ticket information regarding open job tickets for each of the joint use utilities on the list of joint use utilities. Once work on the job ticket has been completed, the joint use utility client may transmit to the computer system 500 a job ticket notification indicating a status of the job ticket for a joint use utility in the list of joint use utilities. Once received, the computer system may further update the joint use utility database with the status of the job ticket, as well as with any changes to the joint use information relating to the joint use utility.

In another set of embodiments, the computer system 500 may include in the computer readable media further instructions to identify, via the end device, a geographic location of the end device. In various embodiments, the end device may include a GPS receiver in communication with one or more GPS satellites, from which the computer system 500 may retrieve location information regarding the end device. Similarly, in a further set of embodiments, the computer system 500 may include in the computer readable media further instructions to identify, via a smart attachment on a joint use utility, the location of the joint use utility. In various embodiments, as with the end device, the smart attachment of a joint use utility may include a GPS receiver in communication with one or more GPS satellites, from which the computer system 500 may retrieve location information regarding the end device.

According to yet further sets of embodiments, the computer system 500 may include further instructions to receive, from the end device, a selection of at least one joint use utility of the list of joint use utilities. The computer system 500 may generate, based on the geographic location of the end device and the respective location information corresponding to each of the at least one joint use utility, a route from the geographic location of the mobile device to a geographic location of a first joint use utility of the selection of at least one joint use utility. The computer system may then plot the route on the interactive map. In various embodiments, the computer system may further identify one or more one proximate joint use utility of the list of joint use utilities that is within a threshold range of the physical location of the end device. The computer system 500 may then indicate the locations each of the one or more proximate joint use utilities.

In another set of embodiments, the computer system 500 may further include instructions to determine, based on the job ticket notification, whether an existing job ticket is present. If no job ticket exists, the computer system 500 may create a new job ticket. If an existing job ticket has an open status, the computer system may determine whether there is a subsequent joint use agreement member still having to complete work on the job ticket. In various embodiments, the job ticket information regarding the job ticket may specify an order of joint use agreement member having to completed work on the joint use utility. Thus, if there is a subsequent joint use agreement member still having to complete work for the job ticket, the computer system may identify the subsequent joint use agreement member to go and notify the subsequent joint use agreement member of the open job ticket. If the computer system 500 determines that no subsequent joint use agreement member remains on the job ticket, then the computer system 500 may close the job ticket. In a further set of embodiments, the status of each job ticket may be indicated on the interactive map by joint use utility indicator itself, such that a user of an end device may ascertain the status of a job ticket corresponding to that joint use utility at a glance of the interactive map. The status may be indicated visually on the interactive map utilizing, without limitation, color coding, patterning, different shapes, bubbles or popups containing textual information, or other suitable techniques.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for joint use utility management comprising:
 a joint use utility database maintaining entries for a plurality of joint use utilities, each of the entries respectively having joint use information regarding an associated joint use utility of the plurality of joint use utilities, the joint use information indicating at least each member of a joint use agreement having an attachment at the associated joint use utility, and location information of the associated joint use utility;
 an end device associated with a first member of the joint use agreement, the joint use agreement having a plurality of members including the first member, the end device being communicatively coupled to a communications network;
 a smart attachment located at the associated joint use utility, the smart attachment comprising:
  at least one first processor;
  a first non-transitory computer readable media having encoded thereon computer software comprising a first set of instructions executable by the at least one first processor to:
   determine whether there is a first open job ticket associated with the associated joint use utility;
   determine whether the end device associated with the first member of the joint use agreement is within a pre-defined range of the associated joint use utility; and
   based on a determination that there is the first open job ticket associated with the associated joint use utility and that the end device associated with the first member of the joint use agreement is within the pre-defined range of the associated joint use utility, transmit the first open job ticket associated with the associated joint use utility to the end device associated with the first member of the joint use agreement;
a joint use utility manager in communication with the joint use utility database and the end device over the communications network, the joint use utility manager comprising:
at least one second processor;
a second non-transitory computer readable media having encoded thereon computer software comprising a second set of instructions executable by the at least one second processor to:
receive, from the end device, a request for one or more second open job tickets associated with the first member;
retrieve, from the joint use utility database, a list of joint use utilities use utilities associated with the first member having a second open job ticket, and respectively associated joint use information for each of the joint use utilities;
generate an interactive map populated with an indicator of each of the joint use utilities having the second open job ticket and associated with the first member based on the location information of each respective joint use utility in the list of joint use utilities, wherein job ticket information associated with each respective joint use utility is accessible through the interactive map;
transmit, via the communications network, the interactive map to the end device;
receive, from the end device, a first job ticket notification indicating a status of a first job ticket for a particular joint use utility in the list of joint use utilities;
update, at the joint use utility database, the status of the first job ticket for the particular joint use utility in a respective entry for the particular joint use utility;
receive, from the end device, a second job ticket notification indicating that the first job ticket has been completed;
based on receiving the second job ticket notification indicating that the first job ticket has been completed, identify a second member of the joint use agreement to perform work for the particular joint use utility; and
based on the identification of the second member, generate and transmit a second job ticket to the second member of the joint use agreement.

2. The system of claim 1, wherein the joint use utilities are joint use utility poles.

3. The system of claim 2, wherein each of the joint use utility poles are further in communication with at least one of the joint use utility manager or the end device, each joint use utility pole comprising one or more smart attachments transmitting at least one of real-time location information and joint use information for a respective joint use utility pole.

4. The system of claim 3, wherein the one or more smart attachments include a global positioning system receiver in communication with a global positioning system satellite.

5. The system of claim 1, wherein the second set of instructions further comprises instructions that cause the at least one second processor to retrieve, from the end device, location information indicative of a geographic location of the end device.

6. The system of claim 1, wherein the second set of instructions further comprises instructions that cause the at least one second processor to:
receive, from the end device, a selection of at least one joint use utility of the list of joint use utilities;
generate, based on a geographic location of the end device and respective location information corresponding to each of the at least one joint use utility, a route from the geographic location of the end device to a geographic location of a first joint use utility of the selection of at least one joint use utility; and
plot the route on the interactive map.

7. The system of claim 1, wherein the second set of instructions further comprises instructions that cause the at least one second processor to:
identify at least one proximate joint use utility of the list of joint use utilities that is within a threshold range of the end device as determined based on a geographic location of the end device; and
indicate a location of the at least one proximate joint use utility on the interactive map.

8. The system of claim 1, wherein the second set of instructions further comprises instructions that cause the at least one second processor to:
determine whether an existing job ticket is present;
create a new job ticket in response to determining that no existing job ticket is present;
identify a subsequent member of the joint use agreement associated with the particular joint use utility;
notify the subsequent member of the status of the new job ticket associated with the particular joint use utility; and
close the existing job ticket in response to identifying that no subsequent member of the joint use agreement exists.

9. The system of claim 8, wherein the second set of instructions further comprises instructions that cause the at least one second processor to indicate, on the interactive map, a status of each job ticket corresponding respectively to each joint use utility.

10. A joint use utility management system comprising:
a smart attachment located at a first joint use utility, wherein the smart attachment is configured to:
determine whether there is a first open job ticket associated with the first joint use utility, determine whether an end device associated with a first member of a joint use agreement is within a pre-defined range of the first joint use utility, and based on a determination that there is the first open job ticket associated with the first joint use utility and that the end device associated with the first member of the joint use agreement is within the pre-defined range of the first joint use utility, transmit the first open job ticket associated with the first joint use utility to the end device associated with the first member of the joint use agreement; and
a joint use utility manager, the joint use utility manager comprising:
at least one processor;
a non-transitory computer readable media having encoded thereon computer software comprising a set of instructions executable by the at least one processor to:
receive one or more communications from the smart attachment located at the first joint use utility, wherein the one or more communications are received when the smart attachment determines whether there is the first open job ticket associated with the first joint use utility, determines whether the end device associated with the first member of the joint use agreement is within the pre-defined range of the first joint use utility, and based on the determination that there is the first open job ticket associated with the first joint use utility and that the end device associated with the first member of the joint use agreement is within the pre-defined range of the first joint use utility, transmits the first open job ticket associated with the first joint use utility to the end device associated with the first member of the joint use agreement;

receive, from the end device associated with the first member of the joint use agreement, a request for one or more second open job tickets associated with the first member;

retrieve, from a joint use utility database, a list of joint use utilities associated with the first member having a second open job ticket, and respectively associated joint use information for each of the joint use utilities, the joint use information indicating at least each member of the joint use agreement having an attachment at a respective joint use utility, and location information of the respective joint use utility;

generate an interactive map populated with an indicator of each of the joint use utilities having the second open job ticket and associated with the first member based on the location information of each respective joint use utility in the list of joint use utilities, wherein job ticket information associated with each respective joint use utility is accessible through the interactive map; and transmit, via a communications network, the interactive map to the end device;

receive, from the end device, a job ticket notification indicating a status of a first job ticket for a particular joint use utility in the list of joint use utilities;

update, at the joint use utility database, the status of the first job ticket for the particular joint use utility in a respective entry for the particular joint use utility;

receive, from the end device, a second job ticket notification indicating that the first job ticket has been completed;

based on receiving the second job ticket notification indicating that the first job ticket has been completed, identify a second member of the joint use agreement to perform work for the particular joint use utility; and based on the identification of the second member, generate and transmit a second job ticket to the second member of the joint use agreement.

11. The manager of claim 10, wherein the set of instructions further comprises instructions that cause the at least one processor to retrieve, from the end device, location information indicative of a geographic location of the end device.

12. The manager of claim 11, wherein the set of instructions further comprises instructions that cause the at least one processor to:

receive, from the end device, a selection of at least one joint use utility of the list of joint use utilities;

generate, based on the geographic location of the end device and the respective location information corresponding to each of the at least one joint use utility, a route from the geographic location of the end device to a geographic location of a first joint use utility of the selection of at least one joint use utility; and plot the route on the interactive map.

13. The manager of claim 11, wherein the set of instructions further comprises instructions that cause the at least one processor to:

identify at least one proximate joint use utility of the list of joint use utilities that is within a threshold range of the end device as determined based on the geographic location of the end device; and indicate a location of the at least one proximate joint use utility on the interactive map.

14. The manager of claim 10, wherein the set of instructions further comprises instructions to cause the at least one processor to retrieve, via a smart attachment of a joint use utility, location information indicative of a geographic location of the joint use utility.

15. The manager of claim 10, wherein the set of instructions further comprises instructions that cause the at least one processor to:

determine whether an existing job ticket is present;

create a new job ticket in response to determining that no existing job ticket is present;

identify a subsequent member of the joint use agreement associated with the particular joint use utility;

notify the subsequent member of the status of the new job ticket associated with the particular joint use utility; and close the existing job ticket in response to identifying that no subsequent member of the joint use agreement exists.

16. The manager of claim 15, wherein the set of instructions further comprises instructions that cause the at least one processor to indicate on the interactive map, a status of each job ticket of corresponding respectively to each joint use utility.

17. A method of joint use utility management comprising:

providing, at a joint use utility database, entries for a plurality of joint use utilities, each of the entries respectively having joint use information regarding an associated joint use utility of the plurality of joint use utilities, the joint use information indicating at least each member of a joint use agreement having an attachment at the associated joint use utility, and location information of the associated joint use utility;

determining, with a smart attachment located at the associated joint use utility, whether there is a first open job ticket associated with the associated joint use utility;

determining, with the smart attachment, whether an end device associated with a first member of the joint use agreement is within a pre-defined range of the associated joint use utility;

based on a determination that there is the first open job ticket associated with the associated joint use utility and that the end device associated with the first member of the joint use agreement is within the pre-defined range of the associated joint use utility, transmitting, with the smart attachment, the first open job ticket associated with the associated joint use utility to the end device associated with the first member of the joint use agreement;

receiving, via a joint use utility manager, a request from the end device for one or more second open job tickets;

identifying the first member of the joint use agreement as having sent the request; identifying joint use utilities associated with the first member;

retrieving, via the joint use utility manager and from the joint use utility database, a list of joint use utilities associated with the first member having a second open job ticket, and respectively associated joint use information for each of the joint use utilities;

generating, at the joint use utility manager, an interactive map populated with an indicator of each of the joint use utilities having the second open job ticket and associated with the first member based on the location information of each respective joint use utility in the list of joint use utilities, wherein job ticket information associated with each respective joint use utility is accessible through the interactive map;

transmitting, via the joint use utility manager over a communications network, the interactive map to the end device;

receiving, at the joint use utility manager, a job ticket notification submitted by the end device, the first job ticket notification indicating a status of a first job ticket for a particular joint use utility in the list of joint use utilities;

updating, via the joint use utility manager, the status of the first job ticket for the particular joint use utility in a respective entry for the particular joint use utility at the joint use utility database;

receiving, via the joint use utility manager and from the end device, a second job ticket notification indicating that the first job ticket has been completed;

based on receiving the second job ticket notification indicating that the first job ticket has been completed, identifying, via the joint use utility manager, a second member of the joint use agreement to perform work for the particular joint use utility; and based on the identification of the second member, generating and transmitting, via the joint use utility manager, a second job ticket to the second member of the joint use agreement.

18. The method of claim 17, further comprising:

identifying, at the joint use utility manager, a geographic location of the end device;

identifying, with the joint use utility manager, at least one proximate joint use utility of the list of joint use utilities that is within a threshold range of the end device as determined based on the geographic location of the end device; and indicating, via the joint use utility manager, a location of the at least one proximate joint use utility on the interactive map.

19. The method of claim 17, further comprising:

identifying, at the joint use utility manager, a geographic location of the end device;

receiving, at the joint use utility manager, a selection from the end device of at least one joint use utility of the list of joint use utilities;

generating, with the joint use utility manager, based on the geographic location of the end device and respective location information corresponding to each of the at least one joint use utility, a route from the geographic location of the end device to a geographic location of a first joint use utility of the selection of at least one joint use utility; and plotting, with the joint use utility manager, the route on the interactive map.

20. The method of claim 17, further comprising:

determining, via the joint use utility manager, whether an existing job ticket is present;

creating, via the joint use utility manager, a new job ticket in response to determining that no existing job ticket is present;

identifying, via the joint use utility manager, whether there is a subsequent member of the joint use agreement associated with the particular joint use utility;

notifying, via the joint use utility manager, the subsequent member of the status of the new job ticket associated with the particular joint use utility; and closing, via the joint use utility manager, the existing job ticket in response to identifying that no subsequent member of the joint use agreement exists.

* * * * *